(12) United States Patent
Bosshart

(10) Patent No.: US 8,193,832 B1
(45) Date of Patent: Jun. 5, 2012

(54) ARBITER ARRAY USING TWO-DIMENSIONAL ADDRESS DECODING

(75) Inventor: Patrick W. Bosshart, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 8 days.

(21) Appl. No.: 13/031,204

(22) Filed: Feb. 19, 2011

(51) Int. Cl.
*G03C 8/00* (2006.01)
*H03K 19/082* (2006.01)
*H03K 19/094* (2006.01)

(52) U.S. Cl. .............................. 326/105; 326/39; 326/41

(58) Field of Classification Search .......................... None
See application file for complete search history.

(56) References Cited

U.S. PATENT DOCUMENTS 5,581,767 A * 12/1996 Katsuki et al. .................. 712/11
2003/0198251 A1 10/2003 Black et al.
2005/0027920 A1 2/2005 Fitzsimmons et al.
2009/0074408 A1 3/2009 Black et al.
2011/0103397 A1 * 5/2011 Koka et al. ..................... 370/458

* cited by examiner

*Primary Examiner* — Anh Tran

(74) *Attorney, Agent, or Firm* — John R. Pessetto; W. James Brady; Frederick J. Telecky, Jr.

(57) ABSTRACT

A system comprises a plurality of requesting agents and granting agents configured in an array of rows and a plurality of columns. Corresponding to each requesting agent is a plurality of row address decoders and column address decoders, one row decoder for each row of granting agents and one column decoder for each column of granting agents. Each row decoder receives a first subset of an address' bits from a requesting agent and generates a row output bit provided to each granting agent in the row of that row address decoder. Each column decoder receives a second subset of bits of the address and generates a column output bit provided to each granting agent in the column corresponding to such column decoder. Each granting agent logically combines the row and column output bits from row and column decoders of a requesting agent to generate a request signal for the granting agent.

23 Claims, 3 Drawing Sheets

ARBITER ARRAY USING TWO-DIMENSIONAL ADDRESS DECODING

BACKGROUND

Crossbar connections are common in large integrated circuits (ICs). On such ICs, a crossbar connection provides connections between multiple requesting units and multiple resources. Such requesting units may comprise processors or input channels. The resources may comprise interleaved components of a large memory or output channels. A conductive pathway (e.g., a wire) exists from each requesting unit to each resource. In some systems, each resource is potentially accessible by multiple requesting units. To accommodate such shared use of a resource, arbitration logic is provided for each resource. Thus, each requesting unit has conductive pathways to each such arbitration logic.

For a system comprising, for example, 10 requesting units and 10 resources (and commensurate arbitration logic units), each requesting unit has 10 conductive pathways to each of the 10 resources for a total of 100 conductive pathways from requesting units to resources. Another 100 conductive pathways may be provided as well for return messaging back to the requesting units; that is, 200 conductive pathways total. The number of conductive pathways increases non-linearly with the number of requesting units and resources available to such units. For example, for 256 requesting units and 256 resources/arbitration logic units, the number of conductive pathways exceeds 131,000.

The sheer volume of conductive pathways/wires on an IC can become hugely problematic for the design and construction of the IC. The space required for the conductive pathways may be larger than the real estate required for the functional circuitry itself.

SUMMARY

The problems noted above are solved in large part by a system that includes an arbiter array that comprises a two-dimensional array of requesting agents and granting agents (e.g., arbiter). The array comprises rows and columns of requesting agents and granting agents. Each requesting agent generates an address of a target granting agent.

Addresses are assigned to each granting agent in such a way that with the granting agents arranged in the array, all granting agents along a common row have a portion of their address identical. For example, the most significant bits of the addresses are the same for all granting agents in the same row. For all of the granting agents in a given column within the array, the addresses of all such granting agents also have an identical bit pattern for a portion of their addresses. For example, the least significant bits of the addresses are the same for all granting agents in the same column.

For each requesting agent, each row of the array includes a row address decoder and each column of the array includes a column address decoder. Each row address decoder decodes a portion of the address (e.g., the most significant bits) and each column address decoder decodes the rest of the address (e.g., the least significant bits) of an address generated by the corresponding requesting agent. Each row address decoder is configured to determine if the portion of the address it decodes is the precise bit pattern that is common to the portion of the addresses of all of the granting agents in that row. Similarly, each column address decoder is configured to determine if the portion of the address it decodes is the precise bit pattern that is common to the portion of the addresses of all of the granting agents in that column. The decoders assert output row and column bits to signify that the address portion has been successfully decoded.

A given valid address generated by a requesting agent will be successfully decoded by one of the row address decoders and one of the column address decoders. The granting agent that receives both asserted output row and column bits is the granting agent targeted by the requesting agent. The particular granting agent determines that it is the target of the transaction by determining (e.g., a logical AND operation) that both of the output row and column bits are asserted.

The embodiments described herein do not require each granting agent to decode the address. Address decoding logic, instead, is located separate from the granting agents and is located at the row and column levels. This configuration reduces the number of wires needed to interconnect the requesting agents to the granting agents.

In some embodiments, the address bits provided to each row address decoder are different from the address bits provided to each column address decoder. In other embodiments, the address bits provided to each row and column address decoder may share one or more address bits in common. Further, the number of columns may or may not be a power of 2.

Some embodiments are directed to a system comprising a plurality of requesting agents configured in an array. The array comprises a plurality of rows and a plurality of columns of requesting agents. The system also comprises a plurality of granting agents also configured in the array. Corresponding to each requesting agent, also provided are a plurality of row address decoders and a plurality of column address decoders, one row address decoder for each row of granting agents and one column address decoder for each column of granting agent. Each row address decoder receives some of an address' bits from the corresponding requesting agent and generates a row output bit provided to each granting agent in the row corresponding to such row address decoder. Each column address decoder receives all remaining bits of the address from the corresponding requesting agent and generates a column output bit provided to each granting agent in the column corresponding to such column address decoder. Each granting agent logically combines together the row output bit and the column output bit from a row address decoder and a column address decoder of a particular requesting agent to generate a request signal for such granting agent from the particular requesting agent.

Other embodiments are directed to a method that comprises generating, by a requesting agent among a plurality of requesting agents, an address of a granting agent, wherein the requesting agents are configured in an array. The array comprises a plurality of rows and a plurality of columns of requesting agents. Each row has a corresponding row line and each column has a corresponding column line. The granting agents are configured in the array as well, each granting agent receiving one row line and one column line. The method further comprises decoding a portion of the address by a plurality of column address decoders and asserting a column output bit on to one of the column lines by a column address decoder that successfully decodes the portion of the address. The method also comprises decoding a different portion of the address by a plurality of row address decoders and asserting a row output bit on to one of the row lines by a row address decoder that successfully decodes the different portion of the address. The method then comprises generating a request signal by a granting agent that receives an asserted column output bit and an asserted row output bit on its row and column lines.

Other embodiments are directed to a system that comprises a plurality of agents configured in an array. The array comprises a plurality of rows and a plurality of columns of agents. Corresponding to each agent, a plurality of row address decoders and a plurality of column address decoders are provided. Each row address decoder receives some of an address' bits and generates a row output bit provided to each agent in the row corresponding to such row address decoder. Each column address decoder receives all remaining bits of the address and generates a column output bit provided to each agent in the column corresponding to such column address decoder. Each agent logically combines together the row output bit and the column output bit from a row address decoder and a column address decoder to generate a request signal for such agent.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
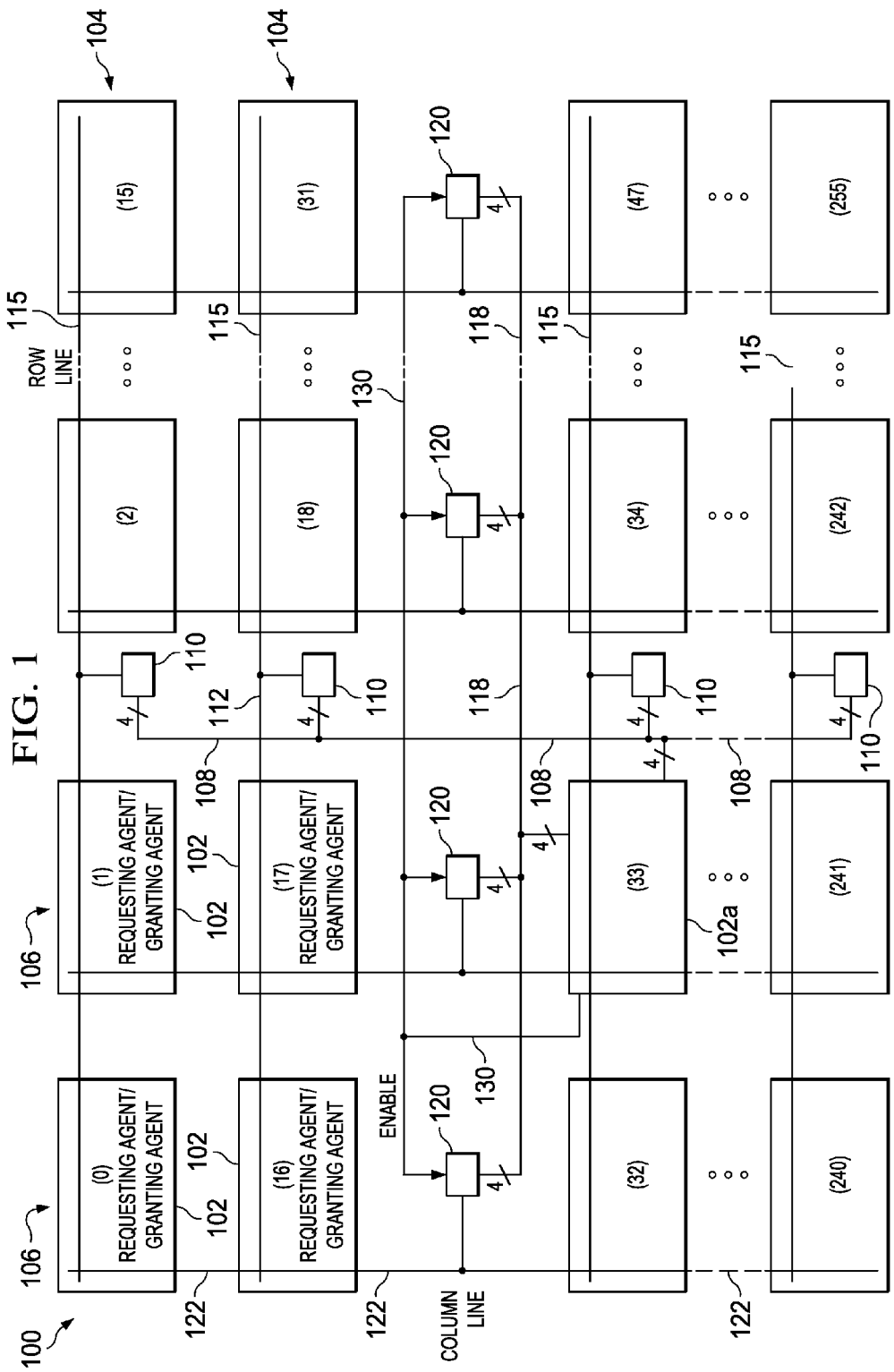
FIG. 1 shows an arbitration system employing two-dimensional address decoding in accordance with the preferred embodiments of the invention.

FIG. 1 illustrates an embodiment of a system 100 comprising an array of requesting agents and granting agents (RA/GA) 102. Each block in FIG. 1 designated as 102 represents both a requesting agent and a granting agent—a single block 102 has been used to represent both types of agents for drawing simplicity. When referring to block 102, it will be clear from the context to which of a requesting agent or a granting agent is being referred. In accordance with at least some embodiments, each requesting agent 102 is located in the same general area as a granting agent.

Each requesting agent may comprise a processor, an input channel, or any other type of logic or source device that may request access to or use of a resource associated with a granting agent. Each such resource may comprise memory, output channels, or another type of resource that can be consumed by a requesting agent, written to by a requesting agent, read by a requesting agent, configured by a requesting agent, etc. Each granting agent also comprises arbitration logic that can receive access requests from the various requesting agents and that determines which pending access request to grant at any point in time. Arbitration may be on a round robin basis, or may prioritize access requests from some requesting agents higher than from other requesting agents. Any suitable arbitration algorithm can be employed.

The array of requesting agents and granting agents 102 comprises multiple rows 104 and columns 106. Each row 104 comprises multiple requesting agents and granting agents 102, and each column 106 comprises multiple requesting agents and granting agents 102. The example shown in FIG. 1 includes 256 requesting agents and 256 granting agents arranged in a 16×16 array. Thus, each row 104 has 16 requesting agents and 16 granting agents 102, and each column 106 also has 16 requesting agents and 16 granting agents 102. The number of requesting agents and granting agents 102 can be varied as desired and the number of requesting agents and granting agents 102 in each row 104 can be different from the number of requesting agents and granting agents 102 in each column (i.e., the array need not be a square array).

Each granting agent 102 is assigned an address. In the example of FIG. 1, the top row 104 of granting agents 102 is assigned addresses 0 to 15 starting on the left and increasing to the right. The addresses are in parentheses. The next row of granting agents is assigned addresses 16 through 31 . The third row is assigned addresses 32 through 47, and so on. The sixteenth row of granting agents 102 is assigned addresses 240 through 255. In the example of FIG. 1, each address is an 8-bit address, although other than 8-bit addressing can be used in other embodiments. The addresses of the top row of granting agents 102 is 0 through 15 (decimal) which in binary is:

| MSBs | LSBs |
|------|------|
| 0000 | 0000 |
| 0000 | 0001 |
| 0000 | 0010 |
| 0000 | 0011 |
| 0000 | 0100 |
| 0000 | 0101 |
| 0000 | 0110 |
| 0000 | 0111 |
| 0000 | 1000 |
| 0000 | 1001 |
| 0000 | 1010 |
| 0000 | 1011 |
| 0000 | 1100 |
| 0000 | 1101 |
| 0000 | 1110 |
| 0000 | 1111 |

As can be seen, all of the upper 4 most significant bits (MSB) are 0. For the second row 106 of granting agents, with addresses from 16 through 31, the 4 MSBs also are the same—0001. Moreover, all of the 4 MSBs of the addresses of the granting agents 102 are the same within a given row yet different from row to row. Thus, the 4 MSBs of an 8-bit address uniquely identify a row in the example of FIG. 1. Given a particular address of a granting agent 102, an examination, therefore, of the 4 MSBs indicates in which row the corresponding granting agent 102 is located, although this information is insufficient to identify the exact granting agent within that row.

An examination of the addresses within each column leads to a similar result, albeit with respect to the 4 least significant bits (LSB). The addresses of the granting agents 102 in the left-hand column in the array shown in FIG. 1 have decimal addresses 0, 16, 32, 48, 64, 80, 96, 112, 128, 144, 169, 176, 192, 208, 224, and 240, which in binary is:

| MSBs | LSBs |
|------|------|
| 0000 | 0000 |
| 0001 | 0000 |
| 0010 | 0000 |
| 0011 | 0000 |
| 0100 | 0000 |
| 0101 | 0000 |
| 0110 | 0000 |
| 0111 | 0000 |
| 1000 | 0000 |
| 1001 | 0000 |
| 1010 | 0000 |
| 1011 | 0000 |
| 1100 | 0000 |
| 1101 | 0000 |
| 1110 | 0000 |
| 1111 | 0000 |

As can be seen, all of the 4 LSBs are 0. For the second column 106 of granting agents, with addresses from 1, 17, 33, . . . , through 241, the 4 LSBs are also the same—0001. Moreover, all of the 4 LSBs of the addresses of the granting agents 102 are the same within a given column yet different from column to column. Thus, the 4 LSBs of an 8-bit address uniquely identify a column in the example of FIG. 1. Given a particular address of a granting agent 102, an examination, therefore, of the 4 LSBs indicates in which column the corresponding granting agent 102 is located. Combining the analysis of the 4 LSBs and the 4 MSBs, the exact targeted granting agent can be identified.

In the example above, the 4 MSBs of the 8-bit addressing scheme are common to each row, and the 4 LSBs of the addresses are common to each column. In other embodiments, the number of bits in each such address portion can be different than 4, and the number of bits in the row-identifying address portion need not be the same as the number of bits in the column-identifying address portion.

Referring still to FIG. 1, for each requesting agent 102, system 100 comprises a row address decoder 110 for each row 104 in the array. A column address decoder 120 is also provided for each column 106 in the array for each requesting agent 102. With 16 rows and 16 columns, there are 16 row address decoders 110 and 16 column address decoders 120 for each requesting agent. FIG. 1 illustrates 16 row address decoders 110 for requesting agent 102a (at the location in which the corresponding granting agent has an address of 33), and 16 column address decoders 120 for that same requesting agent. Each of the other requesting agents also have 16 row address decoders 110 and 16 column address decoders 120, but such other row address decoders and column address decoders are not shown in FIG. 1 to avoid over-cluttering the figure.

Each row address decoder 110 is configured to determine whether a portion of an address generated by its corresponding requesting agent 102 (e.g., the upper 4 MSBs in an 8-bit address) is of a particular bit pattern, namely, the bit pattern corresponding to the addresses of the granting agents 102 in that particular row. For example, the row address decoder 110 in the top-most row 104 in FIG. 1 determines whether an address has 0000 for the 4 MSBs. Each row address decoder 110 generates a signal on a row line 115 to which that row address decoder is connected. The signal on the row line 115 is asserted when the corresponding row address decoder successfully decodes the portion of the address for which that decoder has been configured; otherwise the no signal is asserted on row line 115.

Each column address decoder 120 is configured to determine whether a different portion of an address generated by its requesting agent 102 (e.g., the 4 LSBs in an 8-bit address) is of a particular bit pattern, namely, the bit pattern corresponding to the addresses of the granting agents 102 in that particular column. For example, the column address decoder 120 in the left-most column 106 in FIG. 1 determines whether an address has 0000 for the 4 LSBs. Each column address decoder 120 generates a signal on a column line 122 to which that column address decoder is connected. The signal on the column line 122 is asserted when the corresponding column address decoder successfully decodes the portion of the address for which that decoder has been configured; otherwise the no signal is asserted on column line 122.

In accordance with the preferred embodiments, each requesting agent generates an access request targeting a particular granting agent. The access request includes an address of the targeted granting agent. The row and column address decoders 110, 120 pertaining to that requesting agent attempt to decode the address. Only one row address decoder 110 will successfully decode its respective portion of the address, that is, determine that the address targets a granting agent 102 on the row to which that row address decoder pertains. Similarly, only one column address decoder 110 will successfully decode its respective portion of the address, that is, determine that the address targets a granting agent 102 on the column to which that column address decoder pertains.

Figure 2:
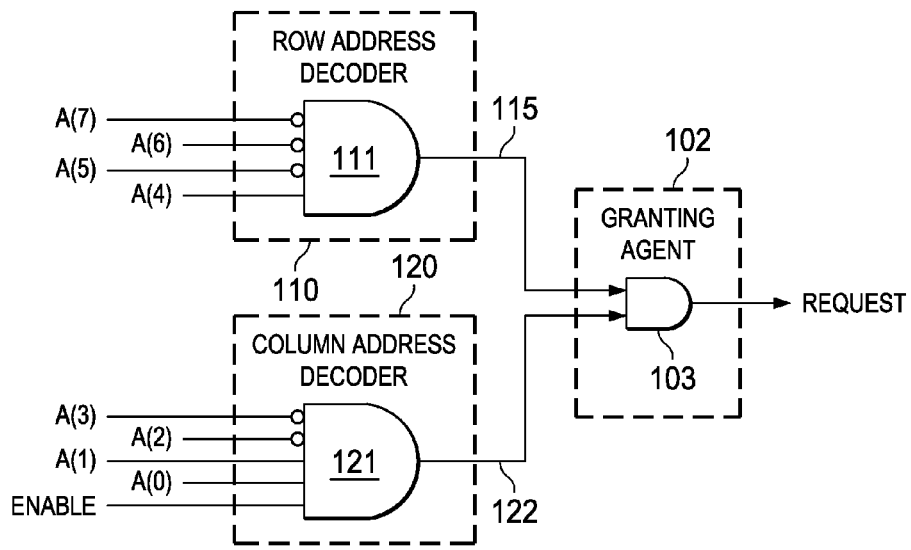
FIG. 2 illustrates a preferred embodiment of row and column address decoders used in the system of FIG. 1.

FIG. 2 illustrates an embodiment of the row and column address decoders. As shown, each row address decoder 110 preferably comprises an AND gate 111 in which some inputs are inverted and other inputs are not inverted. Address bits A<7:4> (address bits 7, 6, 5, and 4—the 4 MSBs) are provided to AND gate 111 with bits A<7:5> being inverted. Thus, the row address decoder 111 in the example of FIG. 2 attempts to decode a bit pattern for A<7:4> of 0001 (i.e.., the second row of granting agents 102 in the illustrative array of FIG. 1).

The column address decoder 120 in FIG. 2 comprises an AND gate 121 and decoders the 4 LSBs A<3:0>. The particular AND gate 121 in FIG. 2 is configured to determine whether the 4 LSBs comprise a bit pattern of 0011 (i.e., the third row in the illustrative array of FIG. 1). If the particular bit pattern from the portion of the address provided to AND gate 111 matches the bit pattern for which the AND gate has been configured (0001 in the example of FIG. 2), then that address portion is considered successfully decoded and the output signal of AND gate 111 is asserted; otherwise, the output signal of AND gate 111 is not asserted. Similarly, if the particular bit pattern from the portion of the address provided to AND gate 121 matches the bit pattern for which AND gate 121 has been configured (0011 in the example of FIG. 2), then that address portion is considered successfully decoded and the output signal of AND gate 121 is asserted; otherwise, the output signal of AND gate 121 is not asserted.

The output signals from the two address decoders 110 and 120 are provided to the granting agent 102 which includes an AND gate 103 that logically ANDs the two address decoder output signals. If both address decoder signals are asserted, then the output signal of AND gate 103 is asserted and represents an asserted Request signal from the initiating requesting agent. If either or both of the row and column address decoders 110, 120 are not able to successfully decode their respective address portions, then the output signals of AND gates 111, 121 will not both be asserted and the Request signal will not be asserted.

In an array of 256 granting agents using an 8-bit addressing scheme, all 256 possible addresses (0 to 255) are used in accordance with at least some embodiments. Accordingly, each requesting agent employs some mechanism to communicate to the row and/or address decoders 110, 120 as to whether a valid address is present on the input bit lines to the address decoders. The address portion provided to a given address decoder may be the address portion from the previous cycle of access requests and thus may not be a current, valid address. In accordance with some embodiments, each requesting agent generates an 8-bit address and a 1-bit Enable signal on line 130. An asserted Enable signal indicates that a valid address is present and should be decoded. In the embodiment of FIG. 1, the Enable signal is provided only to the column address decoders 120. Each column address decoder 120 is configured not to successfully decode an input address portion regardless of the state of the bits of its address portion when the Enable signal is asserted. In FIG. 2, the Enable signal is provided as an input to AND gate 121. When the Enable signal is not asserted ("0"), the output signal on column line 122 will be a 0 regardless of the state of address bits A<3:0>.

In some embodiments, such as that of FIG. 1, the Enable signal is provided only to the column address decoders 120, while in other embodiments, the Enable signal is provided only to the row address decoders 110 to prevent the row address decoders from successfully decoding their input address portion. In yet other embodiments, the Enable signal is provided to both the row address decoders 110 and column address decoders 120 to prevent all of the row and column address decoders from successfully decoding their input address portions.

In some embodiments, all possible combinations of an n-bit address (e.g., 8-bit address) are used as valid addresses of granting/requesting agents. In other embodiments, however, the number of agents is less than the maximum possible number of agents for a particular number of address bits. For example, an 8-bit address could be used for only 250 agents (instead of 256 agents as noted above). Thus, some number of addresses are valid. For 250 agents with 8-bit addressing, six addresses are invalid. When such unused/invalid addresses are generated, no row address decoder and/or column address decoder will generate signals on lines 115, 122. For example, a row address decoder may generate a signal on line 115, but no column address decoder successfully decodes its input address bits. Thus, no target agent is selected. In such embodiments, an Enable bit is not needed. When it is desired to not enable any of the target agents, one of the unused addresses can be output.

As explained above, there is one row address decoder 110 for each row for each requesting agent 102, and one column address decoder 110 for each column for each requesting agent 102. For a 16×16 array of requesting agents (256 requesting agents total) and a corresponding 16×16 array of granting agents, each granting agent potentially could be targeted by one or more or all of the 256 requesting agents. The granting agent then would have to arbitrate for access to its corresponding resource (memory, output channel, etc.) among the as many as 256 requesting agents vying for access.

Figure 3:
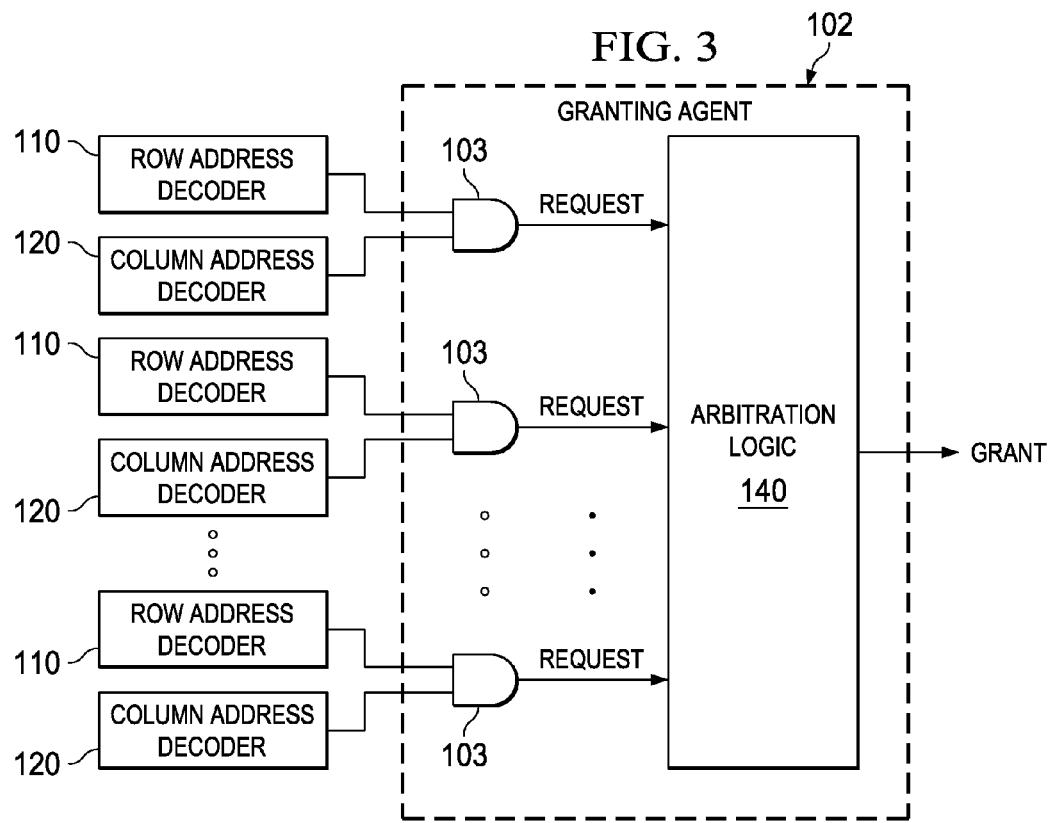
FIG. 3 illustrates a preferred embodiment of row and column address decoders along with an embodiment of granting agent.

FIG. 3 illustrates a granting agent 102 comprising AND gates 103 and arbitration logic 140. Each AND gate 103 receives a signal from a row address decoder 110 and a column address decoder 120 as shown in FIG. 2. Each row and column address decoder 110, 120 for a given AND gate 103 represents the row and column address decoders for a specific requesting agent. In the example in which there are 256 requesting agents, there are 256 pairs of row and column address decoders 110, 120. Each address decoder 110, 120 successfully or not decodes the address portion for which that decoder as been configured as explained above. The output signals from each address decoder is asserted, or not, depending on whether that address decoder was able to successfully decode the address portion. The Request signal from each AND gate 103 is asserted, or not, depending on whether the signals from the corresponding address decoder pair were both asserted.

All of the Request signals are provided to the arbitration logic 140 which determines to which requesting agent to grant access to the corresponding resource. The Grant signals from the various granting agents are transmitted back to the requesting agents granted access via a network of row and column address decoders that is identical, in accordance with at least some embodiments, to that described above with regard to the requests from requesting agents to granting agents. As such, each requesting agent is assigned an address in a scheme similar to that discussed above so that a portion of the address is the same for all requesting agents in a given row, and a different portion of the address is the same for all requesting agents in a given column. The network of address decoders used to transmit the return grant signals back to the requesting agents is not shown in FIG. 1 to avoid over-cluttering the figure.

The configuration described herein results in fewer "wires" within the array of requesting and granting agents compared to other configurations such as the crossbar configuration described above. The term wire refers to conductive traces on a printed circuit board (PCB), or any other type of electrical conductive pathway from one point to another. The address decoding functionality is not contained within the various requesting and granting agents and instead is provided at the row and column level, and separate from the granting agents. Further, a single row signal and a single column signal from each requesting agent is provided to each granting agent.

Referring to FIG. 1, there are 16 vertical wires (column lines 122) through the array and 16 horizontal wires (row lines 115) through the array as well. These 32 wires are for a single requesting agent, and there are 256 requesting agents in the example of FIG. 1 resulting in 8192 wires. In addition to the wire count of the decoded address signals, there are 4 wires that are input into each address and row decoder. Consequently, there are 4 wires arranged vertically from each requesting agent and 4 wires plus 1 Enable bit arranged horizontally (5 horizontal wires) from each requesting agent, resulting in a total of 2304 horizontal and vertical wires corresponding to the 4 MSBs and 4 LSBs of the address plus the Enable bit for each of 256 requesting agent. The total wire count for the requesting agent to granting agent communications including both the decoded wires running through the illustrative array of FIG. 1 as well as the 8 address bits and 1 Enable bit is 5120 vertical wires and 5376 horizontal wires. The same number of wires is also provided for the Grant signal communications from the granting agents back to the requesting agents. Combining both requesting agent to granting agent communications and granting agent to requesting communications, there are 10,240 vertically arranged wires and 10,752 horizontally arranged wires. Extra handshaking wires would be added to this wire count.

Figure 4:
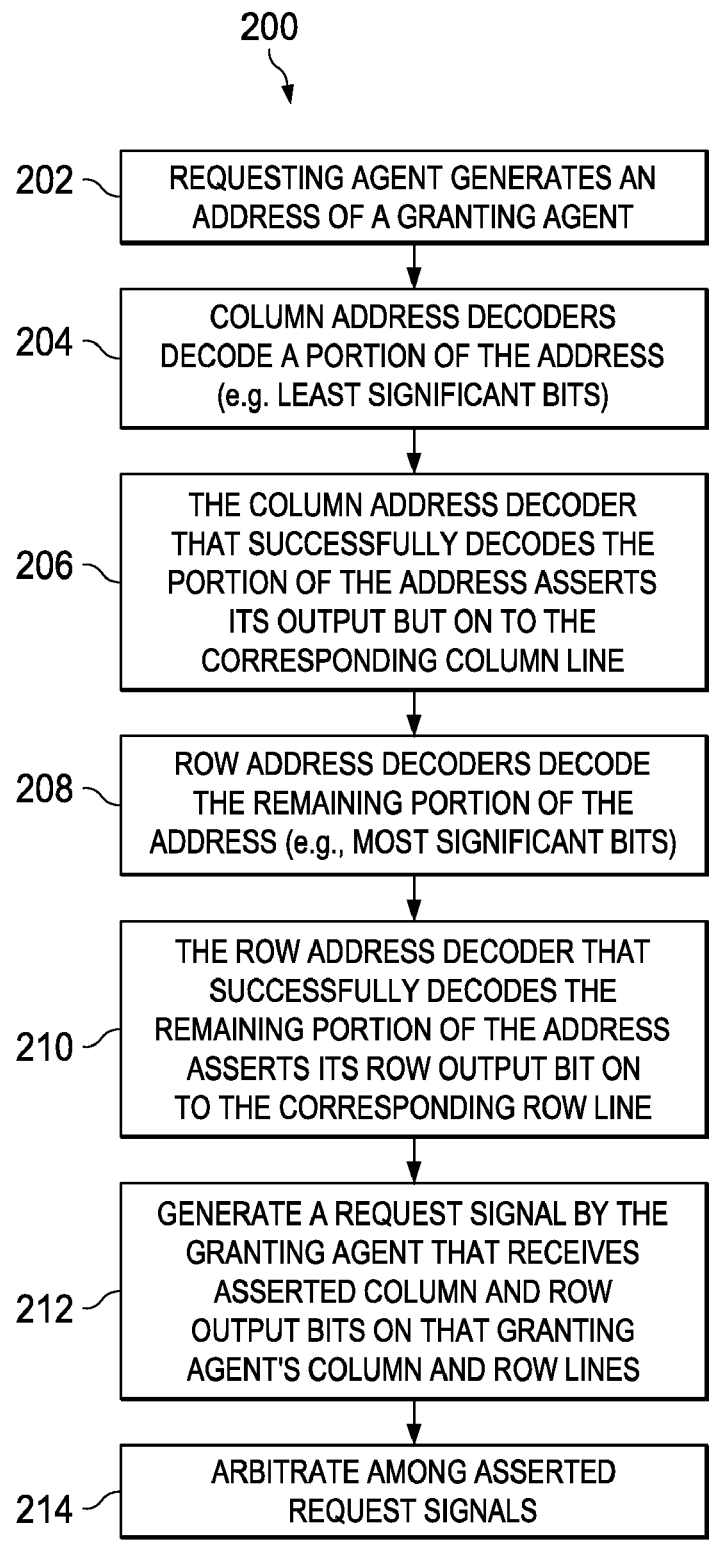
FIG. 4 shows a method in accordance with preferred embodiments of the invention.

FIG. 4 illustrates a method 200 in accordance with various embodiments. The actions depicted can be performed in the order shown or in a different order. Further, the actions can be performed sequentially, or two or more of the actions can be performed in parallel.

At 202, a requesting agent generates an address of a granting agent whose resource the requesting agent wishes to access. At 204, the column address decoders decode a portion of the address (e.g., the 4 LSBs in an 8-bit address). At 206, the column address decoder that successfully decodes the address portion asserts an output signal on its column line 122 indicating that the address portion comprises a bit pattern common to the addresses of that particular column of granting agents.

At 208, the row address decoders decode the remaining portion of the address (e.g., the 4 LSBs in an 8-bit address). At 210, the row address decoder that successfully decodes the address portion asserts an output signal on its row line 115 indicating that the address portion comprises a bit pattern common to the addresses of that particular row of granting agents.

At 212, the method further comprises generating a Request signal by the granting agent 102 that receives asserted signals on the row and column lines 115, 122 received by the particular granting agent. At 214, the granting agents arbitrate among all of their respective Request signals for access to the underlying resources.

In some embodiments, the number of agents in each row and in each column is a power of 2 and may equal each other (e.g., a 16×16 square array). The embodiments described above work for such arrays as well as arrays that have a power of 2 number of columns albeit a non-power of number of rows (e.g., 5 rows by 16 columns). In other embodiments, however, the array comprises a non-power of 2 number of columns (e.g., 16 rows by 11 columns). In such embodiments, the bits provided to each row decoder may include a number of the MSBs as well as one or more, but not all, of the LSBs. Thus, each row decoder 110 in such embodiments includes combinatorial logic that logically combines the MSBs along with the extra LSB(s) to generate a signal on row line 115. Similarly, the bits provided to each column decoder may include a number of the LSBs as well as one or more, but not necessarily all, of the MSBs. Each column decoder 120 in such embodiments includes combinatorial logic that logically combines the LSBs along with the extra MSB(s) to generate a signal on column line 122.

In a further alternative embodiment, each agent may comprise logic that receives the MSBs plus one or more LSBs for a row address and transforms those bits into a smaller number of bits to encode a row address. For example, for an 8-bit address the 4 MSBs plus 2 LSBs may be needed to designate a row in a particular array (e.g., a non-square array). Logic at the agent generating the address transforms those 6 bits into 4 bits to encode the row signal as in the embodiments described previously. Similarly, for column addresses each agent may also comprise logic that receives the LSBs plus one or more MSBs for a column address and transforms those bits into a smaller number of bits to encode a column address.

Thus, in some embodiments, the row address decoders receive and decode a first subset of address bits and the column address decoders receive and decode a second subset of address bits. The first and second subsets preferably are different but may share at least one bit in common or not share any common bits (i.e., no overlap). The first subset of address bits for the row decoders may comprise upper order address bits, while the second subset of address bits for the column decoders may comprise only the remaining lower order bits.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a plurality of requesting agents configured in an array, said array comprising a plurality of rows and a plurality of columns of requesting agents;
a plurality of granting agents also configured in an array of rows and columns;
corresponding to each requesting agent, a plurality of row address decoders and a plurality of column address decoders, one row address decoder for each row of granting agents and one column address decoder for each column of granting agents;
wherein each row address decoder receives a first subset of an address' bits from the corresponding requesting agent and generates a row output bit provided to each granting agent in the row corresponding to such row address decoder;
wherein each column address decoder receives a second subset of said address' bits from the corresponding requesting agent and generates a column output bit provided to each granting agent in the column corresponding to such column address decoder;
wherein each granting agent logically combines together the row output bit and the column output bit from a row address decoder and a column address decoder of a particular requesting agent to generate a request signal for such granting agent from the particular requesting agent.

2. The system of claim 1 wherein each granting agent comprises an AND gate that logically ANDs said row output bit and said column bit from each row address decoder and column address decoder, respectively.

3. The system of claim 1 wherein the first subset includes bits that do not overlap with the second subset.

4. The system of claim 1 wherein the first and second subsets are not the same but share at least one address bit in common.

5. The system of claim 1 wherein the first subset of the address' bits comprise upper order bits of the address.

6. The system of claim 1 wherein the second subset of bits comprise lower order bits of the address.

7. The system of claim 1 wherein each row address decoder decodes the first subset of bits differently than all other row address decoders.

8. The system of claim 1 wherein each column address decoder decodes the second subset of bits differently than all other column address decoders.

9. The system of claim 1 wherein the row address decoders and the column address decoders are separate from the granting agents.

10. The system of claim 1 wherein the number of columns is not a power of 2.

11. A method, comprising:
generating, by a requesting agent among a plurality of requesting agents, an address of a granting agent, wherein the requesting agents are configured in an array, said array comprising a plurality of rows and a plurality of columns of requesting agents, each row having a corresponding row line and each column having a corresponding column line, and wherein the granting agents are configured in the array as well, each granting agent receiving one row line and one column line;

decoding a portion of said address by a plurality of column address decoders;

asserting a column output bit on to one of the column lines by a column address decoder that successfully decodes the portion of the address;

decoding a different portion of said address by a plurality of row address decoders;

asserting a row output bit on to one of the row lines by a row address decoder that successfully decodes the different portion of the address; and generating a request signal by a granting agent that receives an asserted column output bit and an asserted row output bit on its row and column lines.

12. The method of claim 11 wherein the portion of the address comprises lower order bits of the address.

13. The method of claim 11 wherein the portion of the address comprises upper order bits of the address.

14. The method of claim 11 further comprising each granting agent logically AND'ing signals on the row and column lines received by each such granting agent.

15. The method of claim 11 further comprising each column address decoder decoding the portion of the address to determine if the portion comprises a bit pattern unique to the column line corresponding to each such column address decoder.

16. The method of claim 11 further comprising each row address decoder decoding the different portion of the address to determine if the different portion comprises a bit pattern unique to the address line corresponding to each such row address decoder.

17. A system, comprising:

a plurality of agents configured in an array, said array comprising a plurality of rows and a plurality of columns of agents;

corresponding to each agent, a plurality of row address decoders and a plurality of column address decoders;

wherein each row address decoder receives some of an address' bits and generates a row output bit provided to each agent in the row corresponding to such row address decoder;

wherein each column address decoder receives all remaining bits of said address and generates a column output bit provided to each agent in the column corresponding to such column address decoder; and wherein each agent logically combines together the row output bit and the column output bit from a row address decoder and a column address decoder to generate a request signal for such agent.

18. The system of claim 17 wherein the agents comprise arbitration logic.

19. The system of claim 17 wherein the agents comprise requesting agents.

20. The system of claim 17 wherein said some of the address' bits comprise upper order bits of the address and said all remaining bits comprise lower order bits of the address.

21. The system of claim 17 wherein each row address decoder decodes the upper order bits differently than all other row address decoders.

22. The system of claim 17 wherein each column address decoder decodes the lower order bits differently than all other column address decoders.

23. The system of claim 17 wherein the row address decoders and the column address decoders are separate from the first agents.

* * * * *